Aug. 23, 1955   W. L. RUTKOWSKI   2,715,870
BARBECUE DEVICE

Filed Sept. 29, 1953   3 Sheets-Sheet 3

INVENTOR:
WALTER L. RUTKOWSKI
BY
ATTORNEY.

United States Patent Office 2,715,870
Patented Aug. 23, 1955

2,715,870

BARBECUE DEVICE

Walter L. Rutkowski, Normandy, Mo.

Application September 29, 1953, Serial No. 382,899

1 Claim. (Cl. 99—421)

The invention here presented is broadly in the field of outdoor devices for cooking food, and more particularly relates to a structurally and functionally improved barbecue grill for broiling and roasting of food, and, which may be portable, or stationary and particularly adapted for outdoor use.

An important object of the invention is to provide a barbecue grill which has a fire pot in a combustion chamber section below a deck and a reflector plate which is arranged out of vertical alignment with a grill, and a heating chamber section therebelow.

Another object of the invention is to provide a removable grease drip pan adapted to be supported directly below the grill and heating chamber section therebelow.

Still another object of the invention is to provide vertically adjustable and rotatable means for supporting food such as meat or fowl to be roasted above the heating chamber section.

Other objects and details of the invention will be apparent from the following description, when read in connection with the accompanying drawings, wherein.

Figure 1:
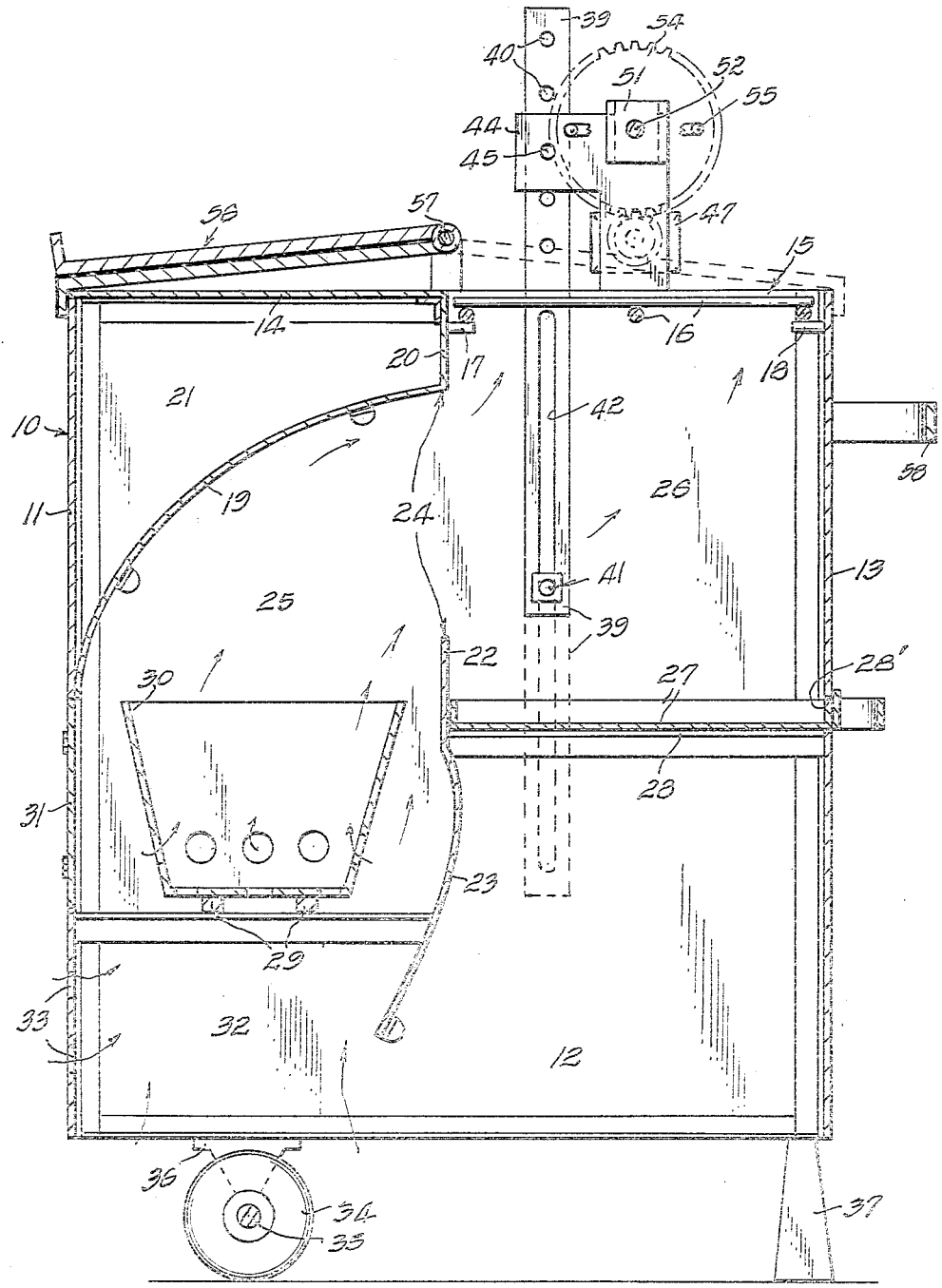
Fig. 1 is a view in vertical section of the barbecue device embodying the features of my invention and showing the relationship of the communicating combustion and heating chambers of the grill and the grease drip pan; showing food roasting mechanism which may be removed when cooking food on the grill only, and showing a hinged removable cover or cap for the device.
Figure 2:
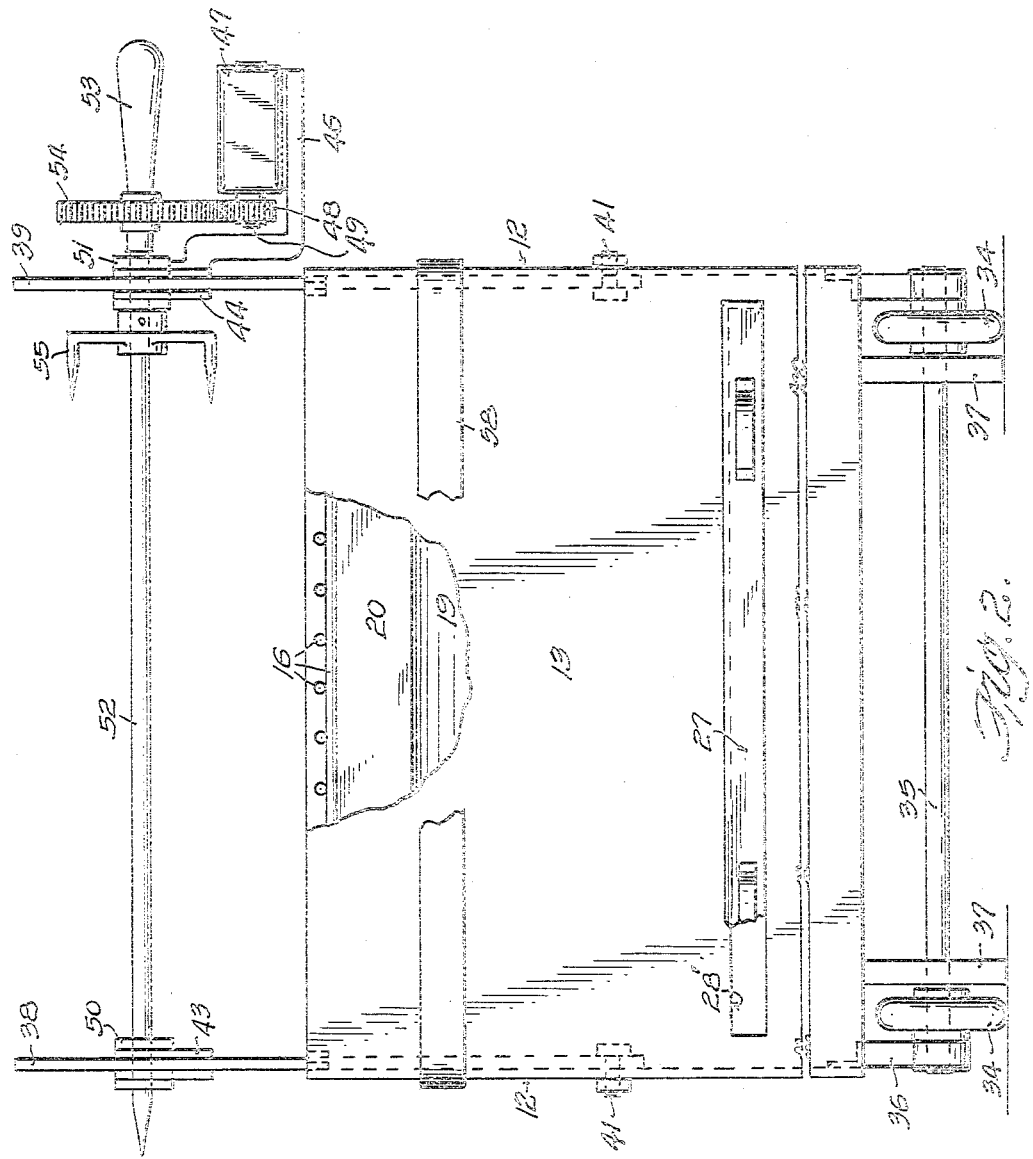
Fig. 2 is a front elevation of the device with the cover, or cap removed and clearly showing the roasting mechanisms and the grease drip pan below the grill.

In the drawings, wherein for the purpose of illustration, is shown an embodiment of the invention, the numeral 10 designates, generally, a suitable rectangularly shaped housing having a rear wall 11, side walls 12, front wall 13 and a top, or deck plate 14 to form a chamber therein. The housing is substantially square in top plan view and the top, or deck plate 14 occupies substantially the rear half of the top of the housing from side wall to side wall, thereby leaving the front half of the top of the housing from side wall to side wall open to provide an opening 15 to receive a suitable grill 16 removably supported by suitable rear and front supporting members 17 and 18 respectively.

A suitable shield, or reflector plate having a curved portion 19 and a vertically disposed section 20 extends transversely of the rear half of the housing chamber entirely across the space between the side walls 12 and is located directly below the top, or deck plate 14, providing thereby a chamber 21 completely enclosed between the rear wall 11, the side walls 12, the top, or deck plate 14 and the curved and lip portions of the shield, or deflector plate. The chamber 21 may, or may not be provided with a suitable insulation material, as desired, dependent upon whether or not the top, or deck plate is to be kept cool, warm, or hot.

The housing chamber is further provided with a heat shield having a straight upper end portion 22 and a curved lower end portion 23. The upper end 22 of the shield lies substantially in vertical alignment with the lip of the aforesaid reflector and is spaced downwardly therefrom to provide a passage 24 connecting a combustion chamber section 25 formed directly below the curved portion 17 of the reflector which serves as an inclined curved ceiling for the combustion chamber section, and a heating chamber section 26 occupying the housing chamber area directly below the grill 16.

A suitable grease drip pan 27 is slidably and removably mounted on suitable supporting means 28 at the lower end of the heating chamber section 26 directly below the grill 16. The pan is removable from the heating chamber section 26 through the front wall opening 28'. The pan 27 catches all drippings from food being broiled upon the grill 16, thus none of the drippings fall into the fire, as will be more clearly apparent hereinafter.

The reference numeral 29 designates a pair of suitable rail like supports spanning the lower end of the combustion chamber section 25 to removably support a suittable elongated fuel containing box, or fire pot 30. The fire pot 30 may be removed from the combustion chamber section 25 by opening a door 31 with which the rear wall 11 may be provided.

The space below the fire pot 30 and rail like supports therefor may be defined as a draft chamber 32 into which air currents may enter through openings 33 in the back wall 11 to supply air to the fuel in the fire pot.

The housing, when made for a portable device, may be supported adjacent the rear lower corners thereof by means of a pair of suitable wheels 34 mounted on a shaft 35 which may be supported in suitable bearing members 36. The front side of the housing may be supported by suitable leg members 37. The housing being open at the lower end thereof, air currents may also enter the combustion chamber through the open bottom of the housing.

The roasting or roastisserie mechanism of the barbecue device will now be described.

The reference numerals 38 and 39 designate a pair of opposed uprights, or supports having a plurality of openings 40. The uprights are vertically adjustable relative to the side walls of the housing and may be held in their adjusted positions by means of suitable fastening devices 41 riding in slotted openings 42 of the supports.

Figure 3:
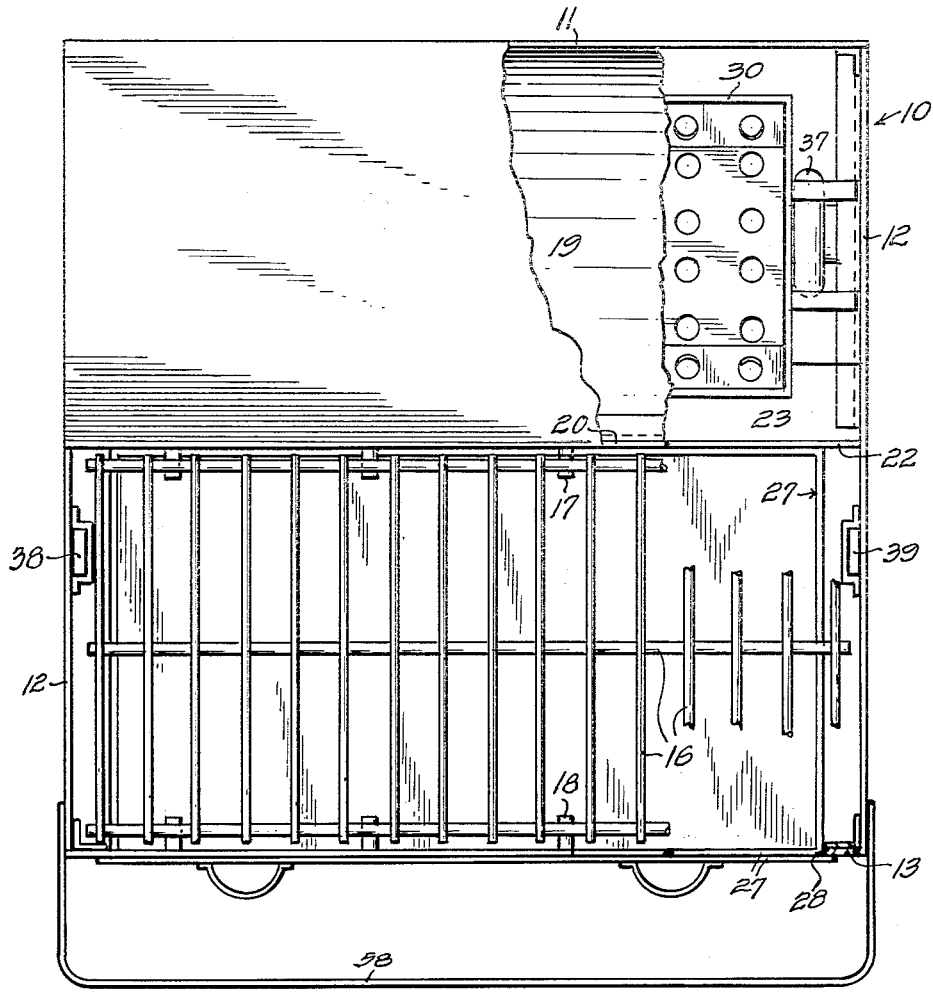
Fig. 3 is a top plan view of the device with the top cover and the food roasting mechanism removed, and showing parts of the device broken away to clearly illustrate parts therebelow.
Figure 4:
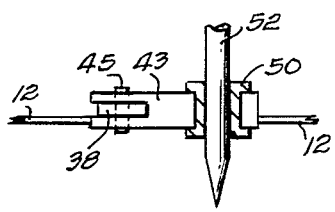
Fig. 4 is a detail in cross-section showing part of the rotary food supporting rod and one of its bearing blocks.
Figure 5:
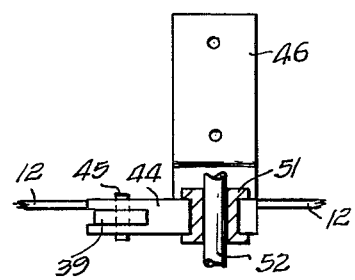
Fig. 5 is a detail in plan view and partly in cross-section showing the other rod bearing block having a shelf for supporting an induction motor having a pinion.

The reference numerals 43 and 44 designate removable brackets which are adjustably mounted on the uprights 38 and 39, respectively, and held in position by means of suitable pins 45 passing through the openings in the uprights, as will be clearly apparent in Fig. 1. The bracket 44 is provided with a suitable integral shelf 46 for supporting a suitable induction motor 47 having a pinion 48 secured to one end of its armature shaft 49, as will be apparent in Fig. 3.

The reference numerals 50 and 51 designate a pair of suitable bearing blocks which are removably supported by the brackets 43 and 44, respectively.

The reference numeral 52 designates a pointed rod having a handle 53 at one end thereof. The rod 52 is adapted to pass through openings in the bearing blocks when supporting food over and above the heating chamber 26 and is slowly rotated by a gear 54 which is in mesh with the pinion 48. As the bearing blocks 50 and 51 are removably supported by the brackets 43 and 44, respectively, it will be apparent that the blocks may be lifted upwardly from the brackets together with the rod 52 including the food thereon. When removing the bearing blocks 50 and 51 including the rod slidingly supported thereby, the gear 54 is also lifted from the pinion 48 as the gear is suitably secured to the food supporting rod 52.

When the roasting mechanism is not to be used, it can be removed from the uprights 38 and 39 and the uprights may be lowered so that the upper ends of the uprights lie in a plane with the upper edge of the housing.

The reference numeral 55 designates a two pronged member which is removably secured to the rod 52. The prongs of the member are adapted to penetrate one end of the meat, or fowl on the rod to cause the meat, or fowl to rotate with the rod 52.

The reference numeral 56 designates a two piece cover, or cap for the housing. The two pieces of the cover are hinged together by means of a hinge pin 57. The cover sections are inclined to shed rain. The entire cover may be removed, or one section thereof may be folded back over the other, as illustrated in Fig. 1.

The many advantages of the herein described invention will readily suggest themselves to those skilled in the art to which is appertains.

While I have above disclosed a preferred embodiment of the structure of the invention herein presented, it is possible to produce still other embodiments without departing from the inventive concept herein disclosed, and it is desired therefore that only such limitations be imposed on the appended claim as are stated therein, or required by the prior art.

Having disclosed my invention, I desire to claim it as follows:

In a barbecue grill, the combination of a housing having a front portion affording a heating chamber therein and a back portion affording a combustion chamber in communication with said heating chamber, a drip pan provided at the bottom of said heating chamber, a fire pot provided in said combustion chamber and spaced rearwardly from said drip pan, a fire shield disposed between the drip pan and the fire pot and projecting above the same, said heating chamber having an open top, a deck plate provided at the top of said housing above said combustion chamber, a pair of fastener elements provided at the inner sides of said housing in the heating chamber, a pair of vertical straps provided with vertical slots having said fastener elements adjustably disposed therein whereby the straps may be vertically adjusted, said straps being disposed at the inner sides of said housing in said heating chamber and projecting upwardly through the open top of the latter, a rotatable spit mounted on the upper end portions of said straps and extending transversely of the housing above the open top of the heating chamber when the barbecue grill is in its operative position, said straps being retractable to an inoperative position wherein the upper ends thereof are substantially flush with the open top of said heating chamber, and a cover provided on said housing for closing the open top of the heating chamber when the straps are retratced into the latter.

References Cited in the file of this patent
UNITED STATES PATENTS

| | | |
|---|---|---|
| 1,491,570 | Thornblade | Apr. 27, 1924 |
| 1,595,846 | Wood | Aug. 14, 1926 |
| 2,046,352 | Warner | July 7, 1936 |
| 2,441,994 | Pasquale | May 25, 1948 |
| 2,512,223 | Contiguglia | June 20, 1950 |
| 2,608,190 | Winning et al. | Aug. 26, 1952 |